United States Patent [19]

Carlson et al.

[11] Patent Number: 5,415,612
[45] Date of Patent: May 16, 1995

[54] COMPRESSIBLE ROLLER

[75] Inventors: James R. Carlson, Franksville, Wis.; Gerald J. Landl, Antioch, Ill.

[73] Assignee: American Roller Company, Union Grove, Wis.

[21] Appl. No.: 263,223

[22] Filed: Jun. 21, 1994

Related U.S. Application Data

[60] Continuation-in-part of Ser. No. 8,904, Jan. 25, 1993, abandoned, which is a division of Ser. No. 897,681, Jun. 12, 1992, Pat. No. 5,206,992.

[51] Int. Cl.⁶ ............................................. B23P 15/00
[52] U.S. Cl. ........................................ 492/56; 492/49; 29/895.32
[58] Field of Search ............................ 492/56, 49, 59; 29/895.32, 895

[56] References Cited

U.S. PATENT DOCUMENTS

| | | | |
|---|---|---|---|
| 2,054,620 | 9/1936 | Freedlander | 101/217 |
| 2,230,289 | 2/1941 | Dodge | 18/59 |
| 2,741,014 | 4/1956 | Hubbard | 29/130 |
| 3,147,698 | 9/1964 | Ross . | |
| 3,467,009 | 9/1969 | Ross . | |
| 3,475,803 | 11/1969 | Hill | 29/132 |
| 3,707,752 | 1/1973 | Brafford et al. | 29/132 |
| 3,730,794 | 5/1973 | Ross | 492/56 |
| 4,287,649 | 9/1981 | Kohler | 492/56 |
| 4,313,981 | 2/1982 | Namiki | 427/409 |
| 4,359,938 | 11/1982 | Koren | 101/148 |
| 4,378,622 | 4/1983 | Pinkston et al. | 101/376 |
| 4,756,056 | 7/1988 | Carlson | 492/56 |
| 4,756,065 | 7/1988 | Carlson | 29/132 |
| 4,844,953 | 7/1989 | Kato et al. | 492/56 |
| 4,981,381 | 1/1991 | Murata | 492/56 |
| 5,257,967 | 11/1993 | Gysin | 492/56 |

Primary Examiner—Irene Cuda
Attorney, Agent, or Firm—Quarles & Brady

[57] ABSTRACT

A compressible roller especially useful in high speed printing systems consists of a rigid core and a compressible cover. The cover consists of a first relatively thick layer of compressible foam containing entrapped gas which is bonded to the core; an elastomeric seal, which prevents the entrapped gas from leaving the foam, bonded to the foam; and an outer print layer of a compatible elastomer bonded to the seal.

6 Claims, 1 Drawing Sheet

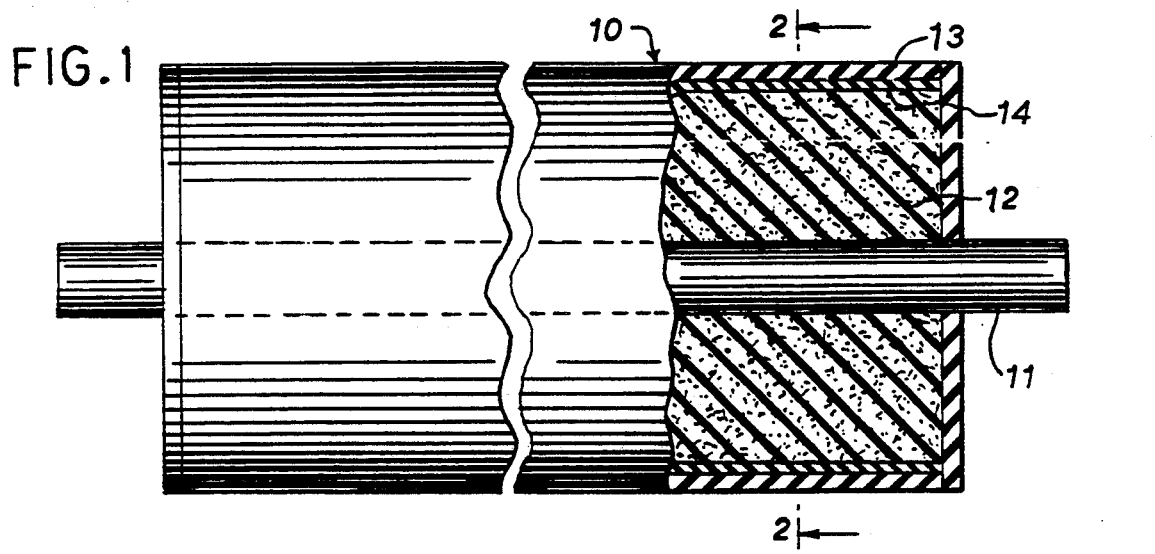
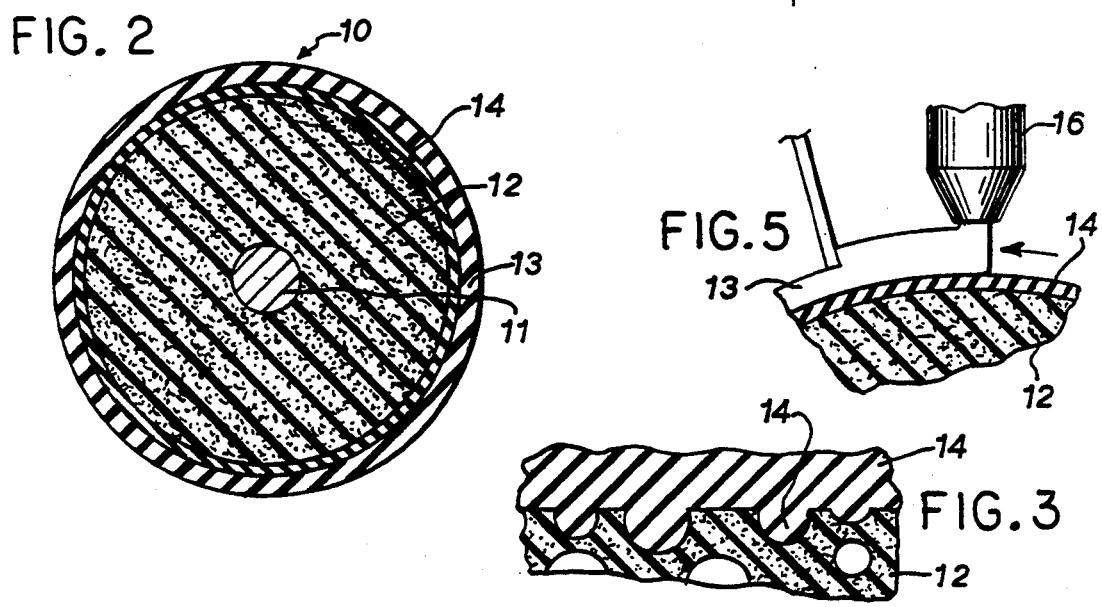
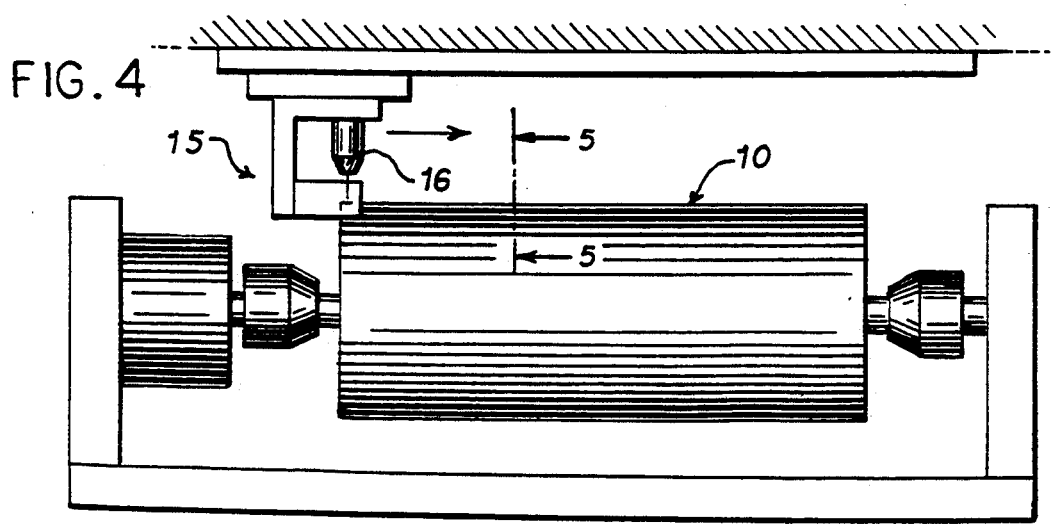

COMPRESSIBLE ROLLER

RELATED CASES

This application is a continuation-in-part of our application U.S. Ser. No. 08/008,904 filed Jan. 25, 1993, abandoned, which in turn is a divisional application of our application U.S. Ser. No. 07/897,681 filed Jun. 12, 1992, now U.S. Pat. No. 5,206,992.

FIELD OF THE INVENTION

The present invention relates to a novel roller. More particularly, it relates to a novel compressible roller useful in the printing industry.

BACKGROUND OF THE INVENTION

The rollers generally in use in the printing industry today are metal roller cores covered with either a solid rubber or a solid plastic cover of varying degrees of hardness.

The solid rubber or plastic covered rollers are elastic but they are not compressible. As a result, when pressures are applied to such rollers, the rubber or plastic moves away from the point of application of pressure in several directions causing distortions or deformation of the rollers without substantially changing their volume.

In most printing operations, a printing roller is used in conjunction with another roller, generally a steel roller. When pressure is exerted on a printing roller with a solid rubber or solid plastic cover by a steel roller, the incompressibility of the cover results in ripples or bulges being formed at the nip and a change in the circumference of the printing roller. In addition to distorting the image being printed, this change in circumference can result in changes of the velocity of the printing roller resulting in heat buildup that can cause the premature destruction of the printing roller, the generation of static electricity and other undesirable effects.

In the Ross U.S. Pat. No. 3,467,009, the various disadvantages of non-compressible solid rubber or plastic covered printing rollers and the advantages of having a compressible printing roller are described. The Ross patent's answer to the need for a compressible printing roller is a metal roller core with a cover having at least three distinct layers of different materials. The first innermost layer of the cover is a layer of highly flexible sponge rubber which covers the metal core. The intermediate layer(s) is (are) of a compressible, dimensionally stable material which is disclosed in the patent as being a fibrous web impregnated with rubber. The outermost layer is a thin protective coating of rubber which covers the outer surface of the intermediate layer(s) and provides a printing surface.

Although the Ross patent roller is described for use in the printing industry, it is not known to have been used therein. Perhaps, the reason is that the Ross patent roller has only a limited ability to recover to its original thickness immediately upon release of an applied force and that is not adequate for use in today's high speed printing systems. In addition, when used in high speed printing the Ross roller construction because of its three or more distinct layers of different materials, is likely to generate excessive internal heat which can cause the premature destruction of the roller.

In the Pinkston et al U.S. Pat. No. 4,378,622, a compressible printing roller is described which consists of a rigid core, a tubular inner layer of microporous, open celled rubber material and a tubular cover disposed about the inner layer. The cover is made of a non-porous polymeric material which provides a printing surface. The inner and outer layers of the Pinkston et al roller are preferably frictionally bound to each other; however, the optional use of an adhesive for that purpose is mentioned. The Pinkston et al roller appears to be relatively difficult to assemble, which probably accounts for it apparently not being used in the printing industry.

Neither the Ross or the Pinkston et al rollers appears to be without serious disadvantages. Therefore, a need still exists for an inexpensive, compressible roller for use in the printing industry.

BRIEF SUMMARY OF THE PRESENT INVENTION

It is an object of the present invention to disclose an inexpensive, compressible roller for use in the printing industry.

It also is an object to disclose a compressible roller having a cover which has the ability to recover to substantially all its original thickness immediately upon the release of an applied force.

Another object is to disclose an inexpensive, practical method of preparing such a compressible roller.

The novel roller of the present invention consists essentially of a rigid core, a first relatively thick layer of compressible foam bonded to said core, an elastomer seal which fills the exposed pores in the outer surface of the foam forming a mechanical bond with the foam layer and preventing gas from escaping therefrom, and an outer layer of a compatible elastomer bonded to the elastomer seal to provide a printing surface.

The method of preparing the novel compressible roller of the present invention comprises applying an adhesive to the outside of the rigid core which is preferably of steel; wrapping a foam layer about the core; wrapping a tape about the core and the foam to compress the foam and insure a good adhesive bond; and curing the adhesive, with heat if necessary, to bond the core and the foam layer together. The tape is then removed and the foam layer is ground to the desired roundness and thickness. Next, the outer surface of the foam layer is covered with a thin coat of liquid elastomer to fill the exposed pores. The elastomer cures to form a seal which is mechanically bonded to the foam layer and prevents any gas contained within the foam from later exiting and causing voids in the material of the outer or print layer. The cured seal elastomer is chemically tacky (i.e., it contains reactive sites which will bond with the outer or print layer elastomer). The outer or print layer is then formed by applying one or more ribbon coatings of an elastomer over the chemically tacky seal while rotating the core until the outer layer is built up to the desired thickness. The outer layer at this stage is of greater thickness than the desired thickness of the final outer layer. The ends of the thus assembled roller are then sealed so that fluid cannot enter the exposed ends of the layers and the roller is cured at room temperature. Finally, the outer layer of roller is ground to the desired thickness to obtain a roller which is round and has a surface of the desired smoothness.

The foregoing and other objects and advantages of the invention will become apparent to those skilled in the art from the description of the preferred embodiment.

BRIEF DESCRIPTION OF THE DRAWINGS

FIG. 1 is an elevational view, partly in section, of a roller of the present invention;

FIG. 2 is a sectional view taken along line 2—2 in FIG. 1;

FIG. 3 is an enlarged view showing the interface of seal and the foam layer;

FIG. 4 is a diagramic view showing the outer layer of the roller of FIG. 1 being formed; and FIG. 5 is a view taken along line 5—5 in FIG. 4.

DESCRIPTION OF THE PREFERRED EMBODIMENT

In the preferred embodiment of the invention as seen in FIGS. 1 and 2, the roller 10 consists of a rigid roller core 11, an intermediate foam layer 12 and an outer or print layer 13.

The preferred roller 10 is made by gluing a layer of foam onto a metal core; wrapping the foam layer 12 with a nylon tape (not shown) to compress the foam, and baking and curing the thus formed assembly. The nylon tape is then removed and the foam layer 12 ground to the desired thickness, roundness and smoothness. The ground surface is then covered with a thin coating of a bonding agent. Next, a coating of a liquid room temperature vulcanizing (RTV) elastomer is applied over the foam layer 12. The elastomer enters into the exposed pores of the foam to mechanically bond to the foam and forms a seal 14 (seen best in FIG. 3) which prevents any gases from within the foam layer 12 from later leaving and causing voids in the outer or print layer 13. The outer or print layer 13 is then formed by applying multiple ribbon coatings of a compatible liquid room temperature vulcanizing elastomer over the seal 14 until an outer layer is obtained which is thicker than the desired thickness of the final outer layer. The exposed ends of the foam layer and outer layer are then sealed with the elastomer to prevent fluid from entering the layers. The thus assembled roller is cured at room temperature. Finally, the outer layer of roller is ground to obtain a layer 13 of the required specifications of thickness, smoothness and roundness.

The preferred core 11 is a conventional steel roller core. However, the core may be of other materials, such as fiberglass, provided they possess the required rigidity and other functional properties for use as the core of a printing roller.

A preferred intermediate foam layer 12 is a closed cell polyvinyl chloride/nitrile rubber sponge having a compressibility of about 16 to 28 PSI as measured by ASTM D1056. It can be purchased from the Rubatex Corp. in tubular form under the product designation R 1843H2 SBE.42.

In addition to the preferred foam, any other type of foam material can be used which possesses the desired compressibility and resistance to the solvents and the chemicals which might reach the intermediate foam layer under conditions of use.

The adhesive used to glue the foam layer 12 to the core 11 can be any adhesive suitable for that purpose. When the foam is polyvinyl chloride/nitrile rubber and the core is steel the preferred adhesive is the epoxy R1003/H5002 which can be obtained from Epic Resins Inc.

The preferred bonding agent which is used to coat the ground foam layer 12 is an elastomer adhesive, such as CHEMLOK 233 which can be obtained from the Lord Corporation of Erie Pa.

The preferred elastomer for forming the seal 14 is a room temperature vulcanizing polyurethane which has a viscosity of about 1000–2000 centipoise which permits it to enter the exposed pores of the foam layer 12. The elastomer hardens and ceases to flow within 1½ to 5 minutes depending upon the temperature of the materials used (100°–150° F.) and it forms a strong mechanical bond between the seal 14 and the foam layer 12 (best seen in FIG. 3.). The seal 14 which is about 0.020 to about 0.040 inches thick, preferably 0.025 to 0.035 inches, remains chemically tacky and prevents gas from escaping from the foam layer and entering the outer or print layer where it can cause undesirable and unacceptable voids.

The preferred elastomer for forming the seal 14 is a polyurethane that can be prepared from a hydroxyl terminated polyester resin comprising 100 parts of a blend of 2000 MW linear polyester diol, about 3.0 parts of a trifunctional crosslinker (such as trimethylol propane) and about 52.5 parts of an isocyanate of the diphenylmethyl diisocyanate type. It also contains a catalyst (e.g. about 0.04 to 0.06 parts of an organometallic or amine catalyst) and stabilizer and color additives.

The elastomer for forming the outer or print layer 13 is one which is "compatible" with the elastomer of the seal 14. In this context "compatible" means that the elastomer of the outer layer will form a satisfactory bond, mechanical and/or chemical, with the cured chemically tacky seal 14. Especially preferred is the same liquid room temperature vulcanizing polyurethane used for the seal 14. When used to form a print layer 13 of about 0.030 to about 0.090 inches thick (preferably about 0.060 inches) and seal 14 and fully cured, the preferred elastomer has a durometer of about 50 to about 70 Shore A (preferably about 60–65) as measured by ASTM 2240. Other urethanes and elastomers having the desired properties and resulting in a print layer 13 having a durometer of about 30 Shore A to about 80 Shore A can be used providing they are compatible with the seal elastomer.

The practice of the invention is further illustrated by the Examples which follow:

EXAMPLE 1

Application of Preformed Foam Layer to Core

A core body of rigid steel about 50" in length is cleaned of all grease, oil and foreign material.

A closed cell PVC/nitrile foam tube which has been cleaned on the inside with methyethylketone is then bonded to the core body using an epoxy adhesive (Epic Resin R1003/H5002). The epoxy adhesive is applied to both the core body and the inner diameter of the foam tube. The foam tube which has a thickness of about 0.875" is then expanded using air pressure and slid over the core body.

The assembly is wrapped with nylon tape that is 2 inches in width. The tape is wrapped around the roll from one end to the other. This is done to ensure that all air has been removed from between the core body and the inner diameter of the foam tube. The epoxy adhesive is then allowed to cure at room temperature for a minimum of 8 hours. Once the adhesive is cured, the wrapping tape is removed, and the assembly is placed in an oven at 100°–200° F. for about 2 hours to stress relieve the foam. Once the foam is stress relieved, the core/foam assembly is placed into a grinder and the foam is then ground to 0.005"–0.200" under the desired finished size of the finished roller.

EXAMPLE 2

Application of Foam Layer to Core

A core body of rigid steel about 50" in length is cleaned of all grease, oil and foreign material. The cleaned core is then abraded using sand paper, a rotary sander, a belt sander or it is blasted with metallic grit to prepare the surface for application of the primer and bonding agent.

To the cleaned, sanded or blasted core is applied a primer coat which upon drying is then covered with a bonding agent of various types, most usually also urethane based. The primer materials are of the polyvinyl butyral type that is cured with a phosphoric acid catalyst, such as Conap AD-6, Chemlok 9944 Wash primer or the like. The cover cement is of a wide variety available, to be chosen from many such systems supplied from Lord Corporation or Norton, these possibly being Chemlok 210, Chemlok 213, Thixon 405 or the like. The preferred system is the Chemlok 9944 Wash Primer and Thixon 405.

Once the application of the primer/cover combination has been completed, the roller is placed in a lathe and begun rotating at 3–35 rpm about the center line axis of the core. At that time, a two component urethane foam is processed through a mix metering machine and dispensed on the rotating core at the same time allowing the dispensing head to traverse across the face length of the core being covered. As the liquid adheres to the core, it gradually begins to blow and rise to a height that will eventually represent the foam base of the roller. Dependent on the coating conditions, the ambient temperature and the size of the core, one or more layers can be used to achieve the final wall thickness. Once coated, the foam is post cured 2 hours at 212° F. to drive the reaction to completion. The foam in question can be between 5–23 pcf (free blow density), with compressibility of about 2–50 psi as measured by ASTM D1056. The two component foam system is available from Polyurethane Specialties Company, Lyndhurst, N.J., as their Milloxane Series of open cell urethane foams.

Once the foam has been postcured and allowed to cool, it is ground to the required size and ready to be covered with the seal and polyurethane print layers.

It will be apparent to those versed in the art that any number of foams could be developed and applied to the metallic core as the compressible layer in this construction. These foams could be either polyether or polyester in nature or of a specialty type, all providing the open celled construction and the inherent interfacial bonding quality necessary between a polyurethane foam and the elastomeric polyurethane covering that can be achieved without use of interfacial bonding agents.

EXAMPLE 3

Preparation of RTV Urethane for Seal and Outer Layer

A polyurethane resin mixture containing 100 parts of a polyester masterbatch which is a blend of OH-terminated polyols and crosslinkers, a hydrolytic stabilizer and a pigment, is reacted with a blended diphenylmethane diisocyanate, and catalyzed with an amine or organometallic catalyst.

The preferred material for the seal and the outer or print layer is comprised of 100 parts of a 2000 MW diethylene glycol adipate resin (available under the names Forrez 11-55 from Witco Corporation, Rucoflex (S1011-55 from RUCO Polymer Corporation, and others), 3.5 parts of a trifunctional crosslinker, more particularly TMP (trimethylolpropane). 1.25 parts of a hydrolytic stabilizer (available from Miles, Inc. as Stabaxol 1), 0.25 parts of a pigment, and 0.0625–0.075 parts of an amine catalyst (available from Air Products as Dabco DC2). This blend is then reacted with a stoichiometric amount (about 50–62 parts) of an isocyanate adduct prepared from 100 parts of the same 2000 MW diethylene glycol adipate resin and 105–150 parts of pure or modified diphenylmethane diisocyanate (available as Mondur M from Miles, Inc., Isonate 2181 from Dow Chemical, or preferentially ISO 227 from BASF Corporation). The complete mixture has a viscosity of 1000–2000 centipoise, and hardens and ceases to flow in 1½–5 minutes at 100°–150° F.

It will be apparent to those skilled in the art that a wide variety of polyester resins, tri-functional crosslinkers, and diphenylmethane diisocyanate types or other isocyanate sources can be utilized without departing from the basic nature of the covering.

EXAMPLE 4

Application of Seal and Outer or Print Layer

The undersized rollers (core and foam assembly) from Example 1 and 2 are primed with CHEMLOK 233 and coated with a seal coating of the polyurethane resin of Example 3 (mixed immediately before application) by rotating the roller at 3–35 rpm about a center line axis of the core and applying the urethane to the foam using a mix metering machine 15 of the type seen in FIGS. 4 and 5. The seal coating which is about 0.025 to about 0.035 inches thick is applied first and allowed to penetrate and cure for 7 minutes to form the seal 14 which is mechanically bound to the foam. The outer or print layer 13 is then applied over the seal 14 while the seal 14 is still chemically tacky (i.e., it still has reactive sites that will be bound to the urethane that forms the layer 13). The same polyurethane resin and mix metering machine are employed. The polyurethane resin is applied while the dispensing head 16 traverses across the axis of the roller while the roller is rotating. The traverse of the machine is usually 25–75% of the liquid polyurethane stream coming out of the machine. (Example: stream width: 0.100"; machine traverse: 0.025"–0.075").

Because the core/foam/seal assembly is rotating while the mix metering machine is traversing down the axis, a homogenous outer coating is formed. The outer coating is cured by allowing the roller to sit at room temperature for up to seven days (oven curing can be used, if desired, to speed up the curing time). The cured outer coating is then ground to obtain a layer 13 of the desired thickness (e.g. about 0.01 to about 0.125 inches).

The compressible roller of the present invention is especially useful as a printing roller. However, because of its light weight and ability to absorb shocks, it also can be used in place of other ink mover or distributor rolls in printing systems.

It will be apparent to those skilled in the art that a number of changes can be made without departing from the spirit and scope of the present invention. Therefore, it is intended that the invention be only limited by the claims.

We claim:

1. A compressible roller, said roller comprising a rigid core; and a compressible cover adhered to said core, said cover consisting essentially of a first relatively thick layer of compressible foam containing entrapped gas bonded to said core; an elastomeric seal bonded to said foam and preventing the escape of gas therefrom; and an outer layer of an elastomer bonded to the elastomeric seal, said outer layer being formed by applying a ribbon coating of a compatible liquid room temperature vulcanizing elastomer over the seal while the seal is tacky so that a bond forms between the seal and the outer layer.

2. A roller of claim 1 in which the compressible foam is of nitrile rubber.

3. A roller of claim 1 in which the compressible foam is of polyurethane.

4. A roller of claim 1 in which both the elastomer seal and the compatible elastomer are room temperature vulcanizing urethanes.

5. A roller of claim 1 in which the ends are sealed with an elastomer.

6. A compressible printing roller comprising: a rigid roller core; a compressible foam layer containing entrapped gas attached to said core; a seal made by applying a layer of room temperature vulcanizing urethane about 0.020 to about 0.040 inches thick bonded to and sealing the compressible foam layer to prevent the escape of gas therefrom; and, an outer print layer of a compatible room temperature vulcanizing urethane bonded to the seal, said print layer being comprised of a room temperature vulcanizing urethane having a durometer when cured of about 30 Shore A to about 90 Shore A.

* * * * *